(12) United States Patent
Jobe

(10) Patent No.: US 8,764,088 B1
(45) Date of Patent: Jul. 1, 2014

(54) COMBINATION TRUCK BED RAMP AND GATE

(71) Applicant: Tracy Hutch Jobe, Bixby, OK (US)

(72) Inventor: Tracy Hutch Jobe, Bixby, OK (US)

( * ) Notice: Subject to any disclaimer, the term of this patent is extended or adjusted under 35 U.S.C. 154(b) by 83 days.

(21) Appl. No.: 13/787,145

(22) Filed: Mar. 6, 2013

(51) Int. Cl.
*B62D 33/023* (2006.01)
*B62D 33/027* (2006.01)
*B65G 69/30* (2006.01)

(52) U.S. Cl.
CPC ............ *B62D 33/0273* (2013.01); *B65G 69/30* (2013.01)
USPC .................... 296/26.08; 296/26.11; 296/37.6; 14/69.5

(58) Field of Classification Search
USPC ...................... 296/26.08, 26.11, 37.6; 14/69.5
See application file for complete search history.

(56) References Cited

U.S. PATENT DOCUMENTS

| | | | |
|---|---|---|---|
| 4,596,417 A | 6/1986 | Bennett | |
| 5,425,564 A | 6/1995 | Thayer | |
| 5,752,800 A | 5/1998 | Brincks et al. | |
| 5,997,066 A * | 12/1999 | Scott | 296/26.08 |
| 6,227,593 B1 | 5/2001 | De Valcourt | |
| 6,340,190 B1 * | 1/2002 | Rosebrugh et al. | 296/26.11 |
| 6,513,688 B2 * | 2/2003 | Kmita et al. | 224/403 |
| 6,616,208 B1 | 9/2003 | Bauer | |
| 6,722,721 B2 | 4/2004 | Sherrer et al. | |
| 6,746,068 B1 | 6/2004 | Hurd | |
| 7,121,607 B2 | 10/2006 | Bauer | |
| 7,237,294 B2 | 7/2007 | Lensing | |
| 8,109,552 B2 * | 2/2012 | Nelson | 296/26.11 |
| 2006/0076794 A1 | 4/2006 | Bauer | |

* cited by examiner

Primary Examiner — Thomas B Will
Assistant Examiner — Katherine Chu
(74) Attorney, Agent, or Firm — Head, Johnson & Kachigian, P.C.

(57) ABSTRACT

The invention relates to a combination ramp and gate that is releasably securable to a truck bed using a three point adjustable attachment system with carabineers, with two of the three carabineers being partially concealed. The combination ramp and gate is lightweight and when collapsed into a closed position, the sections of the combination ramp and gate are coplanar for easy storage and portability.

19 Claims, 6 Drawing Sheets

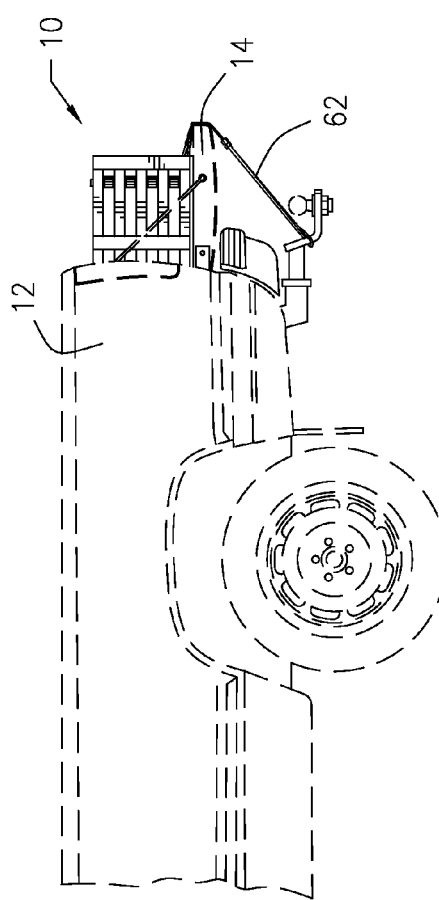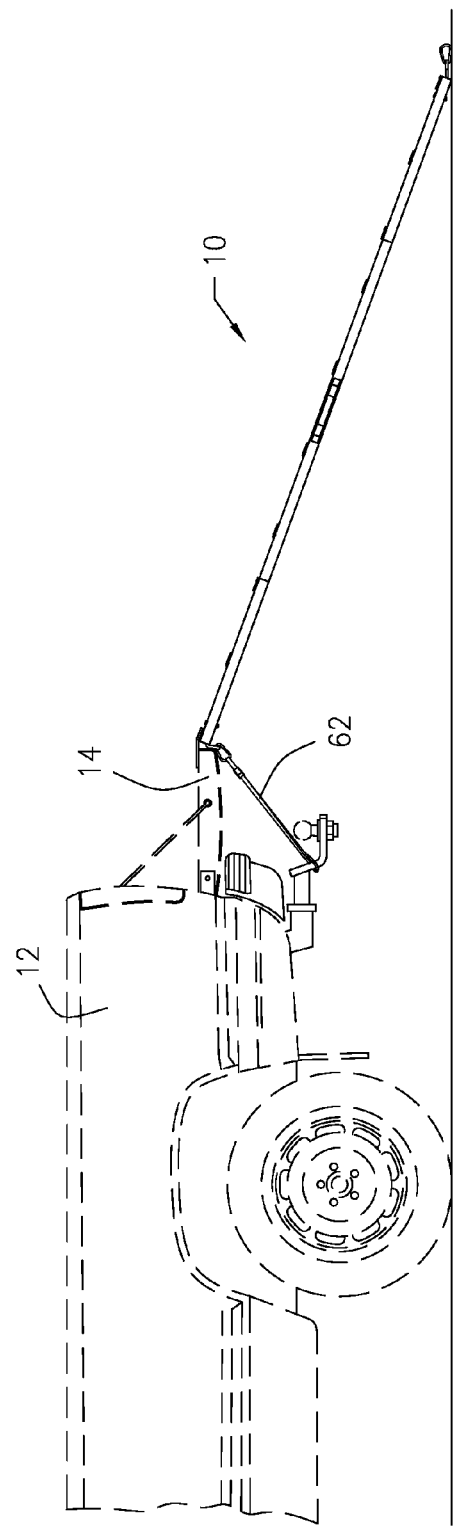

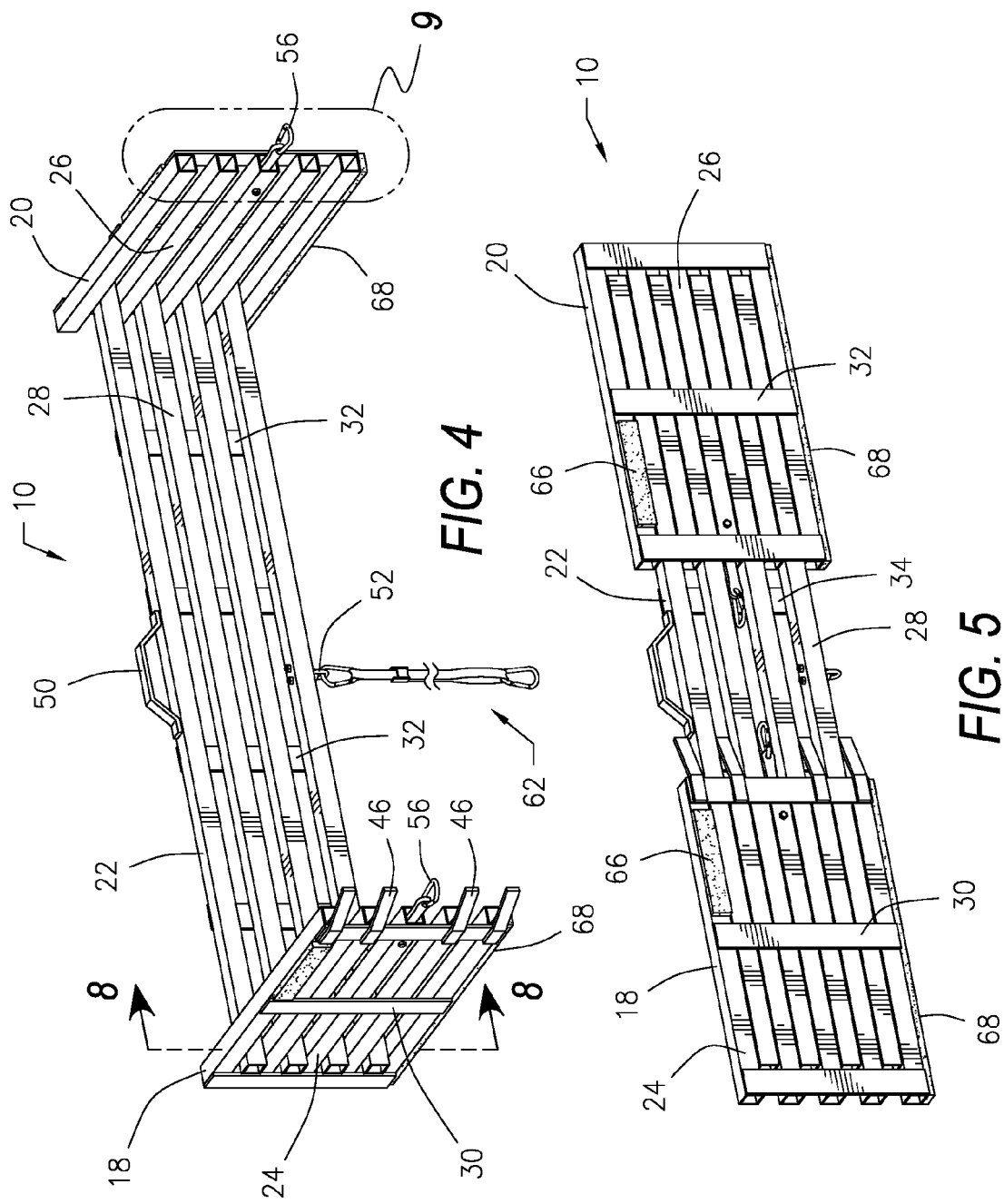

COMBINATION TRUCK BED RAMP AND GATE

CROSS REFERENCE TO RELATED APPLICATIONS

Not Applicable.

BACKGROUND OF THE INVENTION

1. Field of the Invention

This invention relates generally to a combination truck bed ramp and gate, and more particular to an improved combination truck bed ramp and gate allowing easy loading and unloading of wheeled vehicles for pickup trucks and for extending the length of the truck bed onto the tailgate.

2. Description of the Related Art

Loading, unloading and transporting wheeled vehicles, like motorcycles, into a truck bed can be difficult due to the weight and unbalanced aspect of the wheeled vehicle. These tasks become even more difficult when performed by a single person. Further, truck beds tend not to be long enough to accommodate the wheeled vehicle, particularly with the tailgate closed. Various devices have previously been used as ramps for trucks, and specifically trucks having tailgates; however, none have satisfactorily solved the problem of easily getting motorcycles into the truck bed.

It is therefore desirable to provide a combination truck bed ramp and gate having a hinge design that allows the ramp/gate to fold flat for easy transport and storage.

It is further desirable to provide a combination truck bed ramp and gate having an easy and versatile three point adjustable attachment system with climbing style carabineer clips, with two of the three attaching carabineer clips being concealed.

It is yet further desirable to provide a combination truck bed ramp and gate constructed of a resilient, lightweight, non-rusting material, such as aluminum.

It is still further desirable to provide a combination truck bed ramp and gate having a length that reduces loading angle.

BRIEF SUMMARY OF THE INVENTION

In general, in a first aspect, the invention relates to a combination truck bed ramp and gate having a first section and a second section pivotally connected to a central section. The first section, the second section and the central section each include a plurality of support members generally aligned in parallel and a plurality of cross members generally aligned perpendicular to the support members. The first section has opposing terminal ends, with one of the terminal ends having a plurality of projection prongs and the other terminal end having an adjustable strap at least partially concealed within one of the support members. The second section has a terminal end having an adjustable strap that is also at least partially concealed within one of the support members. The central section is pivotally attached along a first pivot axis to the first section and along a second pivot axis to the second section. The central section is pivotally attached intermediate of the first section and the second section such that when the combination truck bed ramp is closed, the first section, the second section and the central section are coplanar.

The combination truck bed ramp and gate may also include a handle along an upper side of the central section and an eyelet on a lower side of the central section. A utility strap having opposing carabiners can be selectively securable to the eyelet of the central section and the truck. Furthermore, the prongs of the first section can be coated with a polymer.

In addition, the first section and the second section can each respectively have an odd number of support members and the central section has an even number of support members, such as the first section and the second section each respectively having five (5) support members and the central section having four (4) support members. Moreover, the terminal ends of the support members of the central section can be respectively pivotally joined along the first axis at an inner terminal end of the support members of the first section and the second axis at an inner terminal end of the support members of the second section in an alternating fashion.

A rubber padding may cover a portion of the first section and/or the second section, such as an upper support member of the first section, an upper support member of the second section, a bottom edge of a lower support member of the first section and/or a bottom edge of a lower support member of the second section.

In general, in a second aspect, the invention relates to a combination truck bed ramp and gate having a first section, a second section and a central section. Each of the sections include a plurality of support members generally aligned in parallel and a plurality of cross members generally aligned perpendicular to the support members. The first section includes opposing terminal ends, with one of the terminal ends having a plurality of projection prongs and the other terminal end having an adjustable strap with a series of adjustment apertures and a carabiner. The adjustable strap is at least partially concealed within one of the support members. A rubber padding covers at least a portion of at least one of the support members of the first section. The also includes a terminal end having an adjustable strap with a series of adjustment apertures and a carabiner. Similarly, the adjustable strap is at least partially concealed within one of the support members, and a rubber padding covers at least a portion of at least one of the support members of the second section. The central section is pivotally attached along a first pivot pin to the first section and along a second pivot pin to the second section. The central section is pivotally attached intermediate of the first section and the second section such that when the combination truck bed ramp is closed, the first section, the second section and the central section are coplanar. The first section and the second section each respectively have an odd number of support members and the central section has an even number of support members.

The combination truck bed ramp and gate can also include a handle along an upper side of the central section and an eyelet on a lower side of the central section. The terminal ends of the support members of the central section can be respectively pivotally joined along the first pivot pin at an inner terminal end of the support members of the first section and the second pivot pin at an inner terminal end of the support members of the second section in an alternating fashion. The prongs of the first section can include a polymer coating, and the rubber padding may cover an upper support member of the first section, an upper support member of the second section, a bottom edge of a lower support member of the first section and/or a bottom edge of a lower support member of the second section.

Other advantages and features of the invention will be apparent from the following description and from the claims.

BRIEF DESCRIPTION OF THE DRAWINGS

FIG. 1 is a perspective view of an example of the device positioned as a truck bed extender and gate in accordance with an illustrative embodiment of the combination truck bed ramp and gate disclosed herein;

FIG. 2 is a perspective view of the device illustrated in FIG. 1 positioned as a truck bed ramp;

FIG. 4 is a perspective view of an example of the device shown in a partially opened position in accordance with an illustrative embodiment of the invention disclosed herein;

FIG. 5 is a perspective view of the device illustrated in FIG. 4 shown in a closed position;

DETAILED DESCRIPTION OF THE INVENTION

Figure 3:
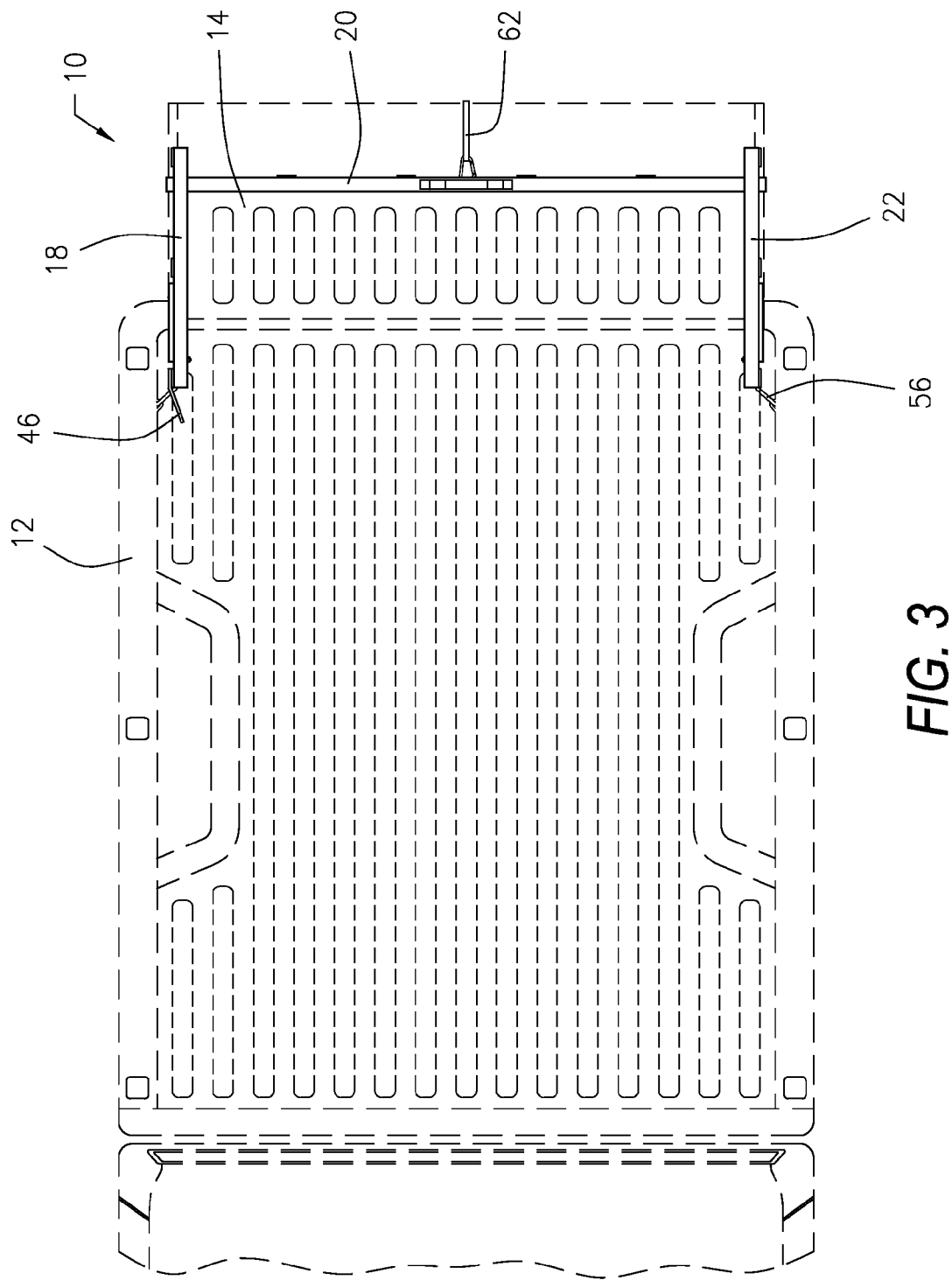
FIG. 3 is a top perspective view of the device illustrated in FIG. 1.

The devices discussed herein are merely illustrative of specific manners in which to make and use this invention and are not to be interpreted as limiting in scope.

While the invention has been described with a certain degree of particularity, it is to be noted that many modifications may be made in the construction and the arrangement of the structural and function details disclosed herein without departing from the scope of the invention. It is understood that the invention is not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "inward," "outward," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the device be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

Referring to the figures of the drawings, wherein like numerals of reference designate like elements throughout the several views, a combination ramp and gate 10 that is selectively securable to a truck bed 12. As illustrated in FIGS. 1 and 3, the combination ramp and gate 10 may be positioned atop the tailgate 14 and secured to the truck bed 12 to be used as a gate. In an alternate mode, the combination ramp and gate 10 can be positioned between the tailgate 14 and the ground 16 to be used as a ramp for access to the truck bed 12.

Figure 6:
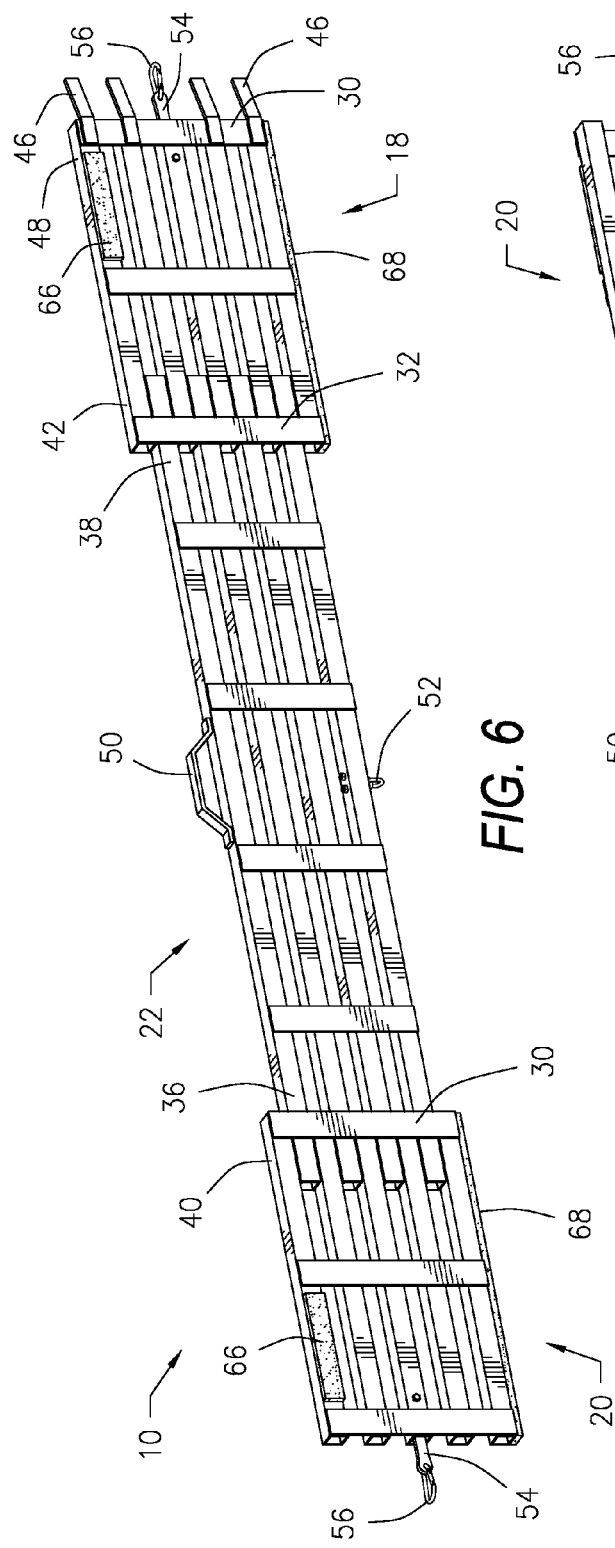
FIG. 6 is a perspective view of an upper side of the device illustrated in FIG. 4 shown in a fully extended position.
Figure 7:
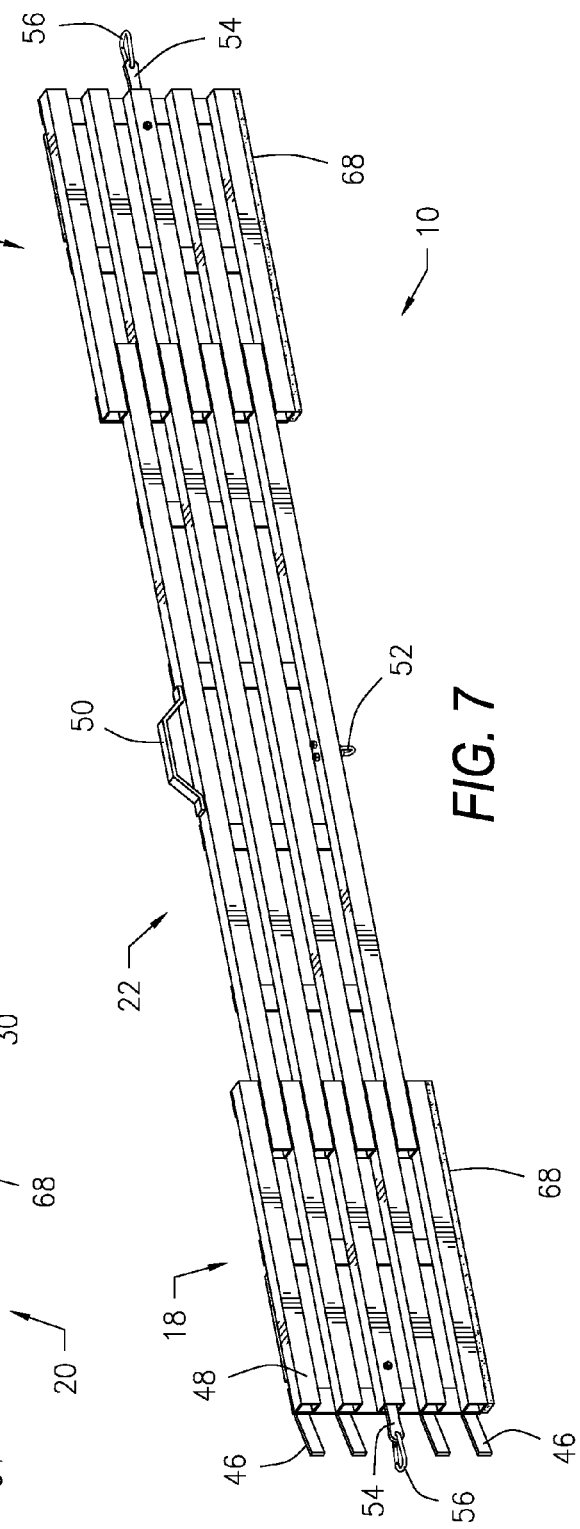
FIG. 7 is a perspective view of a lower side of the device illustrated in FIG. 6.
Figure 8:
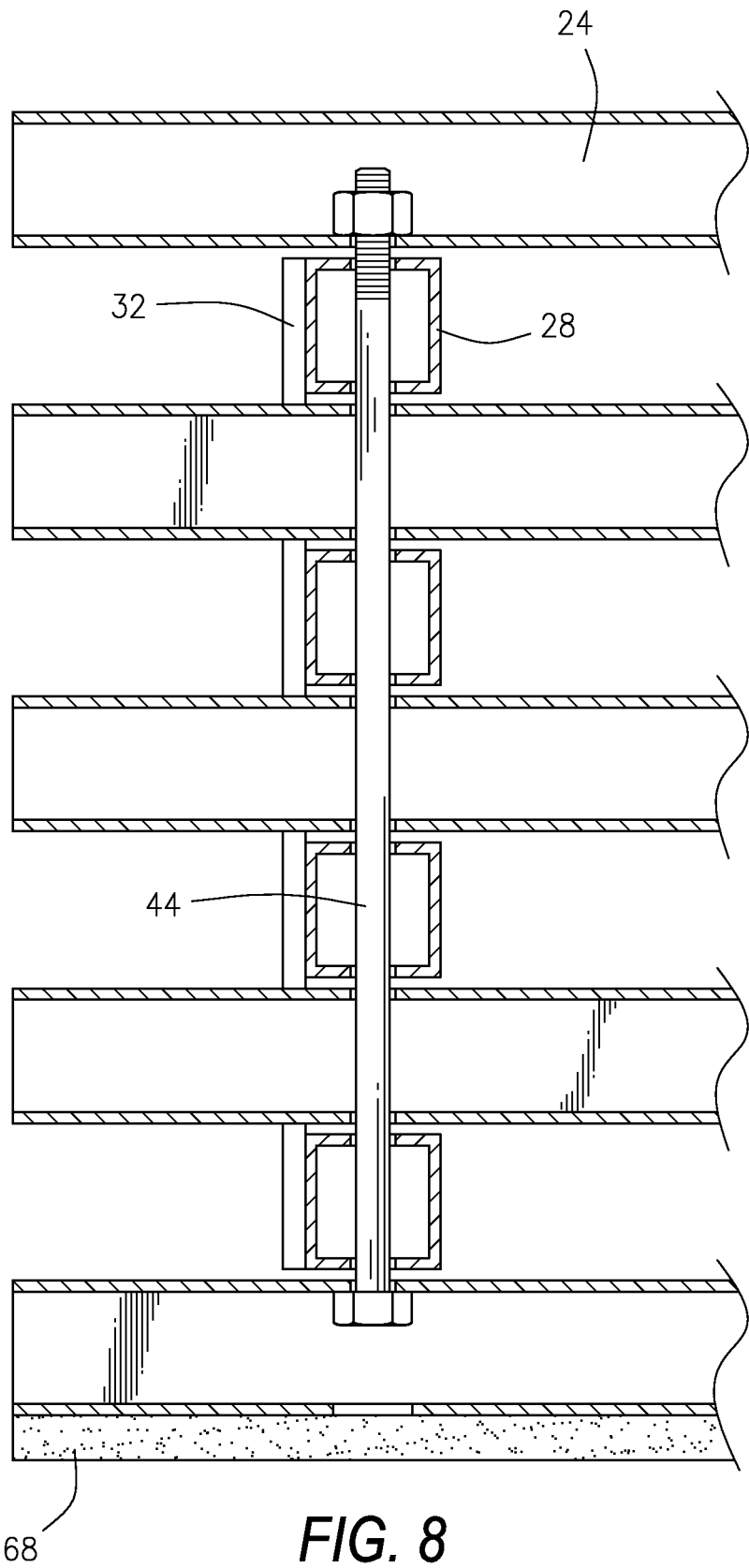
FIG. 8 is a cross-section view along line 8-8 of the device illustrated in FIG. 4.

The combination ramp and gate 10 includes a first section 18, a second section 20 and a central section 22. Each of the first section 18, the second section 20, and the central section 22 include a plurality of spaced, support members 24, 26 and 28 with a plurality of cross-members 30, 32 and 34. As illustrated, each of the support members 24, 26 and 28 are generally aligned in parallel, with the cross-members 30, 32 and 34 being generally perpendicular to the support members 24, 26 and 28. The first section 18 and the second section 20 have a differing number of support members 24 and 26 than the number of support members 28 of the central section 22; for example as illustrated, the first section 18 and the second section 20 each have five (5) support members 24 and 26 while the central section 22 has four (4) support members 28. In addition, the support members 24 and 26 of the first section 18 and the second section 20 alternate the support members 28 of the central section 22. Terminal ends 36 and 38 of the central section 22 are respectively pivotally joined intermediate of inner terminal ends 40 and 42 of the first section 18 and the second section 20 of the combination ramp and gate 10 in an alternating fashion along an axis. As shown in FIG. 8, the pivotal axis can be along a pivot pin 44 joining the inner terminal ends 40 and 42 of the first section 18 and the second section 20 to the terminal ends 36 and 38 of the central section 22. As can be seen in FIGS. 4 and 5, the pivotal movement along the pivot pin 44 is limited by the cross members 30 and 32 of the first section 18 and the second section 20 in relation to the central section 22 when the combination ramp and gate 10 is oriented in the closed position. Similarly as shown in FIGS. 6 and 7, the cross members 30 and 32 limit the pivotal movement of the first section 18 and the second section 20 in relation to the central section 22 when the combination ramp and gate 10 is fully extended. When configured in the closed position illustrated in FIG. 5 or in the fully extended position of FIGS. 6 and 7, the first section 18, the second section 20 and the central section 22 of the combination ramp and gate 10 are all coplanar.

The first section 18 of the combination ramp and gate 10 includes a plurality of prongs 46 projecting from an outer terminal end 48. The prongs 46 can be coated with a polymer material to increase the resistance between the combination ramp and gate 10 and the tailgate 14. The prongs 46 are attached to the combination ramp and gate 10 along one of the cross members 30 of the first section 18. The central section 22 can include a handle 50 and an eyelet 52 on opposing sides of the combination ramp and gate 10.

Figure 9:
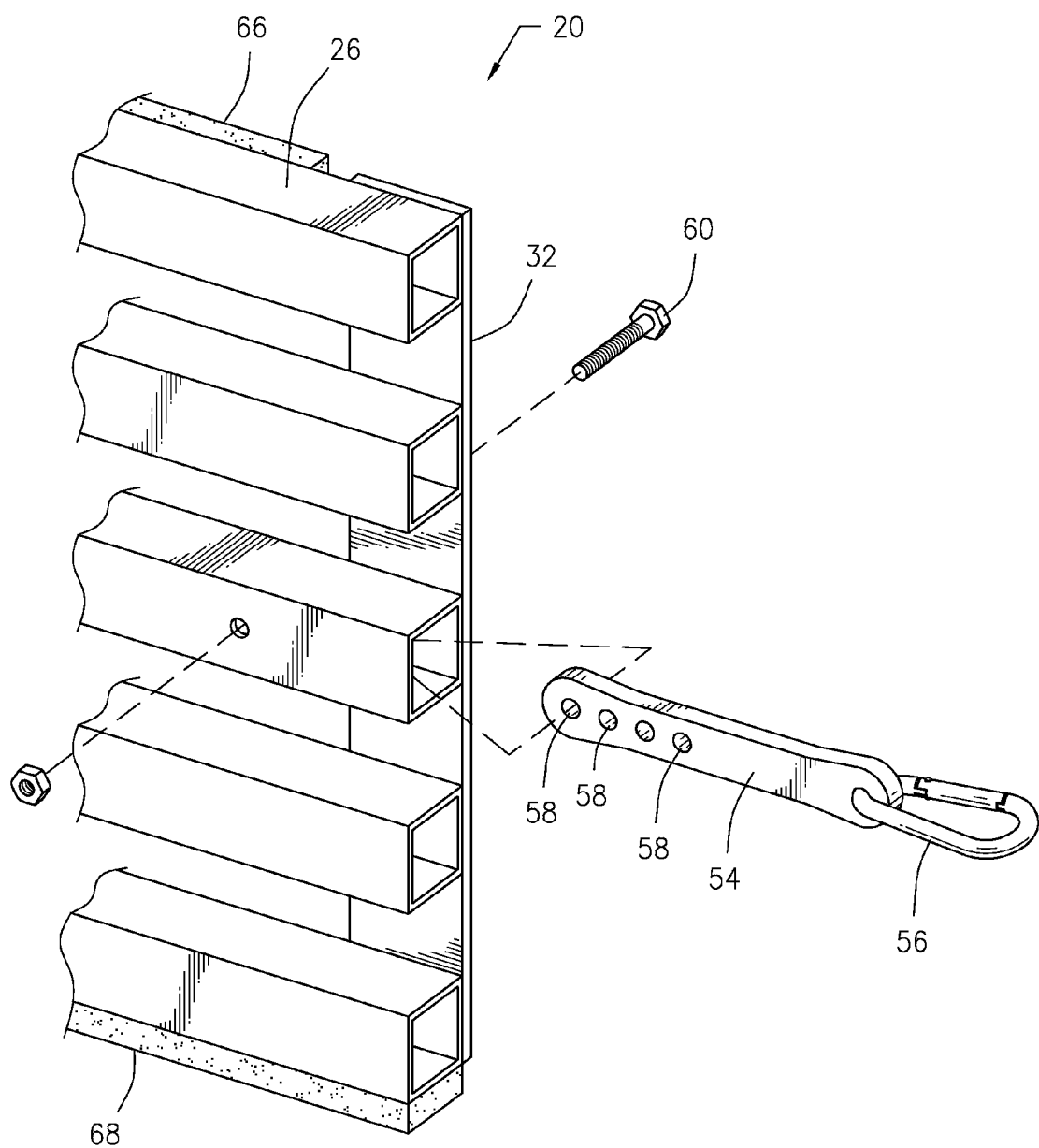
FIG. 9 is an exploded view of area 9 of the device illustrated in FIG. 4.

The first section 18 and the second section 20 of the combination ramp and gate 10 each include an adjustable strap 54 with a carabiner 56. As illustrated in FIG. 9, each of the adjustable straps 54 has a plurality of adjustment apertures 58 through which a fastener 60 is secured. When the combination ramp and gate 10 is used as a gate shown in FIGS. 1 and 3, the carabiner 56 is selectively secured to the truck bed 12 and the apertures 58 allow the tension of the strap 54 to be adjusted, thereby securely fastening the combination ramp and gate 10 to the truck bed 12. Additionally, a utility strap 62 can be used to secure the combination ramp and gate 10 to the hitch of the truck thereby providing additional stability during differing modes of usage.

Moreover, the portion of one of the support members 24 and 26 of the first section 18 and the second section 20 can each respectively include a rubber padding. For example as illustrated in FIGS. 4 and 5, the upper support members 24 and 26 of the first section 18 and the second section 20 can each respectively include the rubber padding 66 intermediate of the outer terminal cross member and the central cross member 30 and 32 to increase resistance between the combination ramp and gate 10 and the truck bed 12. In addition, a bottom edge of the lower support members 24 and 26 of the first section 18 and the second section 20 can each respectively include the rubber padding 68 to increase the resistance between the combination ramp and gate 10 and the tailgate 14 of the truck.

Whereas, the devices have been described in relation to the drawings and claims, it should be understood that other and further modifications, apart from those shown or suggested herein, may be made within the scope of this invention.

What is claimed is:

1. A combination truck bed ramp and gate, comprising:

a first section comprising a plurality of support members generally aligned in parallel and a plurality of cross members generally aligned perpendicular to said support members, said first section further comprising opposing terminal ends, one of said terminal ends having a plurality of projection prongs, another of said terminal ends having a first adjustable strap at least partially concealed within an internal conduit of one of said support members, said first adjustable strap being generally parallel to said internal conduit of said support member of said first section, said first adjustable strap having a series of adjustment apertures generally perpendicular to and enclosed within said internal conduit of said support member of said first section, said adjustment apertures generally parallel to a fastener aperture through said support member of said first section, a fastener for securing said first adjustable strap within said internal conduit, and said first adjustable strap further comprising a carabiner;

a second section comprising a plurality of support members generally aligned in parallel and a plurality of cross members generally aligned perpendicular to said support members, said second section comprising a terminal end having a second adjustable strap at least partially concealed within an internal conduit of one of said support members, said second adjustable strap being generally parallel to said internal conduit of said support member of said second section, said adjustable strap having a series of adjustment apertures generally perpendicular to and enclosed within said internal conduit of said support member of said second section, said adjustment apertures generally parallel to a fastener aperture through said support member of said second section, a fastener for securing said second adjustable strap within said internal conduit, said second adjustable strap further comprising a carabiner;

a central section comprising a plurality of support members generally aligned in parallel and a plurality of cross members generally aligned perpendicular to said support members, said central section pivotally attached along a first pivot axis to said first section, said central section pivotally attached along a second pivot axis to said second section, said central section pivotally attached intermediate of said first section and said second section such that when said combination truck bed ramp is closed and/or fully extended, said first section, said second section and said central section are coplanar.

2. The combination truck bed ramp and gate of claim 1 further comprising a handle along an upper side of said central section.

3. The combination truck bed ramp and gate of claim 1 further wherein said first section and said second section each respectively have an odd number of support members and said central section has an even number of support members.

4. The combination truck bed ramp and gate of claim 3 wherein said first section and said second section each respectively have five (5) support members and said central section has four (4) support members.

5. The combination truck bed ramp and gate of claim 3 wherein terminal ends of said support members of said central section are respectively pivotally joined along said first axis at an inner terminal end of said support members of said first section and said second axis of an inner terminal end of said support members of said second section in an alternating fashion.

6. The combination truck bed ramp and gate of claim 1 wherein said first axis is a first pivot pin and said second axis is a second pivot pin.

7. The combination truck bed ramp and gate of claim 1 wherein said prongs comprise a polymer coating.

8. The combination truck bed ramp and gate of claim 1 further comprising an eyelet on a lower side of said central section.

9. The combination truck bed ramp and gate of claim 8 further comprising a utility strap having opposing carabiners selectively securable to said eyelet of said central section and said truck.

10. The combination truck bed ramp and gate of claim 1 further comprising a rubber padding covering a portion of said first section and/or said second section.

11. The combination truck bed ramp and gate of claim 10 wherein said rubber padding covers an upper support member of said first section and/or an upper support member of said second section.

12. The combination truck bed ramp and gate of claim 11 wherein said rubber padding covers a bottom edge of a lower support member of said first section and/or a bottom edge of a lower support member of said second section.

13. A combination truck bed ramp and gate, comprising:

a first section comprising a plurality of support members generally aligned in parallel and a plurality of cross members generally aligned perpendicular to said support members, said first section further comprising opposing terminal ends, one of said terminal ends having a plurality of projection prongs, another of said terminal ends having a first adjustable strap at least partially concealed within an internal conduit of one of said support members, said first adjustable strap being generally parallel to said internal conduit of said support member of said first section, said first adjustable strap having a series of adjustment apertures generally perpendicular to and enclosed within said internal conduit of said support member of said first section, said adjustment apertures generally parallel to a fastener aperture through said support member of said first section, a fastener for securing said first adjustable strap within said internal conduit, and said first adjustable strap further comprising a carabiner, and a rubber padding covering at least a portion of at least one of said support members of said first section;

a second section comprising a plurality of support members generally aligned in parallel and a plurality of cross members generally aligned perpendicular to said support members, said second section comprising a terminal end having a second adjustable strap at least partially concealed within an internal conduit of one of said support members, said second adjustable strap being generally parallel to said internal conduit of said support member of said second section, said adjustable strap having a series of adjustment apertures generally perpendicular to and enclosed within said internal conduit of said support member of said second section, said adjustment apertures generally parallel to a fastener aperture through said support member of said second section, a fastener for securing said second adjustable strap within said internal conduit, said second adjustable strap further comprising a carabiner, and a rubber padding covering at least a portion of at least one of said support members of said second section; and a central section comprising a plurality of support members generally aligned in parallel and a plurality of cross members generally aligned perpendicular to said support members, said central section pivotally attached along a first pivot pin to said first section, said central section pivotally attached along a second pivot pin to said second section, said central section pivotally attached intermediate of said first section and said second section such that when said combination truck bed ramp is closed, said first section, said second section and said central section are coplanar, an eyelet on a lower side of said central section having a utility strap with opposing carabiners selectively securable to said eyelet of said central section;

wherein said first section and said second section each respectively have an odd number of support members and said central section has an even number of support members; and wherein said first adjustable strap, said second adjustable strap and said utility strap form a three-point adjustment attachment system, said three-point adjustment system are unitary with said combination truck bed ramp and gate.

14. The combination truck bed ramp and gate of claim 13 further comprising a handle along an upper side of said central section.

15. The combination truck bed ramp and gate of claim 13 wherein terminal ends of said support members of said central section are respectively pivotally joined along said first pivot pin at an inner terminal end of said support members of said first section and said second pivot pin of an inner terminal end of said support members of said second section in an alternating fashion.

16. The combination truck bed ramp and gate of claim 13 wherein said prongs comprise a polymer coating.

17. The combination truck bed ramp and gate of claim 13 wherein said rubber padding covers an upper support member of said first section, an upper support member of said second section, a bottom edge of a lower support member of said first section and/or a bottom edge of a lower support member of said second section.

18. The combination truck bed ramp and gate of claim 9 wherein said first adjustable strap, said second adjustable strap and said utility strap form a three-point adjustment attachment system.

19. The combination truck bed ramp and gate of claim 1 wherein said first adjustable strap and said second adjustable strap are unitary with said combination truck bed ramp and gate.

* * * * *